(12) United States Patent
Chae et al.

(10) Patent No.: US 8,539,144 B2
(45) Date of Patent: *Sep. 17, 2013

(54) NONVOLATILE SEMICONDUCTOR MEMORY DEVICE WITH ADVANCED MULTI-PAGE PROGRAM OPERATION

(75) Inventors: Dong-Hyuk Chae, Gwanak-gu (KR); Young-Ho Lim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/561,204

(22) Filed: Jul. 30, 2012

(65) Prior Publication Data
US 2013/0003455 A1 Jan. 3, 2013

Related U.S. Application Data

(63) Continuation of application No. 13/239,494, filed on Sep. 22, 2011, now Pat. No. 8,234,440, and a continuation of application No. 12/021,395, filed on Jan. 29, 2008, now Pat. No. 8,046,525.

(30) Foreign Application Priority Data

Feb. 6, 2007 (KR) .................. 10-2007-0012039

(51) Int. Cl.
*G06F 12/00* (2006.01)

(52) U.S. Cl.
USPC ............... 711/103; 711/138; 711/E12.021

(58) Field of Classification Search
USPC ............... 711/103, 138, E12.021
See application file for complete search history.

(56) References Cited

U.S. PATENT DOCUMENTS

| | | |
|---|---|---|
| 5,606,532 A | 2/1997 | Lambrache et al. |
| 5,930,167 A | 7/1999 | Lee et al. |
| 6,219,276 B1 | 4/2001 | Parker |
| 6,426,893 B1 | 7/2002 | Conley et al. |
| 6,807,096 B2 | 10/2004 | Toda |
| 6,850,435 B2 | 2/2005 | Tanaka |
| 6,937,510 B2 | 8/2005 | Hosono et al. |
| 8,046,525 B2 | 10/2011 | Chae et al. |
| 2004/0210729 A1 | 10/2004 | Horii et al. |
| 2006/0126390 A1 | 6/2006 | Gorobets et al. |
| 2006/0203548 A1 | 9/2006 | You et al. |
| 2007/0061502 A1 | 3/2007 | Lasser et al. |
| 2008/0080237 A1 | 4/2008 | Park |
| 2008/0089123 A1 | 4/2008 | Chae et al. |
| 2009/0089482 A1 | 4/2009 | Traister |

*Primary Examiner* — Larry Mackall
(74) *Attorney, Agent, or Firm* — Volentine & Whitt, PLLC

(57) ABSTRACT

A nonvolatile semiconductor memory device includes a memory cell array having a plurality of banks and a cache block corresponding to each of the plurality of banks. The cache block has a predetermined data storage capacity. A page buffer is included which corresponds to each of the plurality of banks. A programming circuit programs all of the plurality of banks except a last of said banks with page data. The page data is loaded through each page buffer and programmed into each cache block such that when page data for the last bank is loaded into the page buffer, the loaded page data and the page data programmed into the respective cache blocks are programmed into respective corresponding banks.

17 Claims, 7 Drawing Sheets

FIG.3 (CONVENTIONAL ART)
LSB Page Program
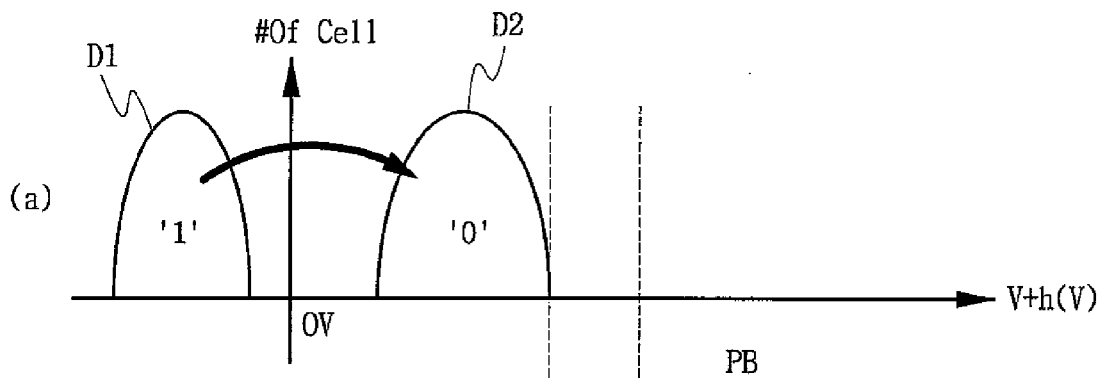
Adjacent Cell Program
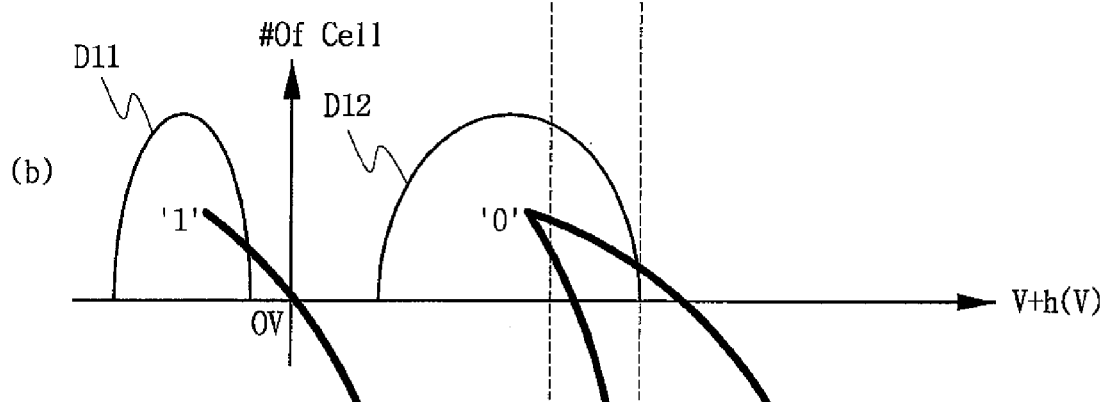
MSB Page Program
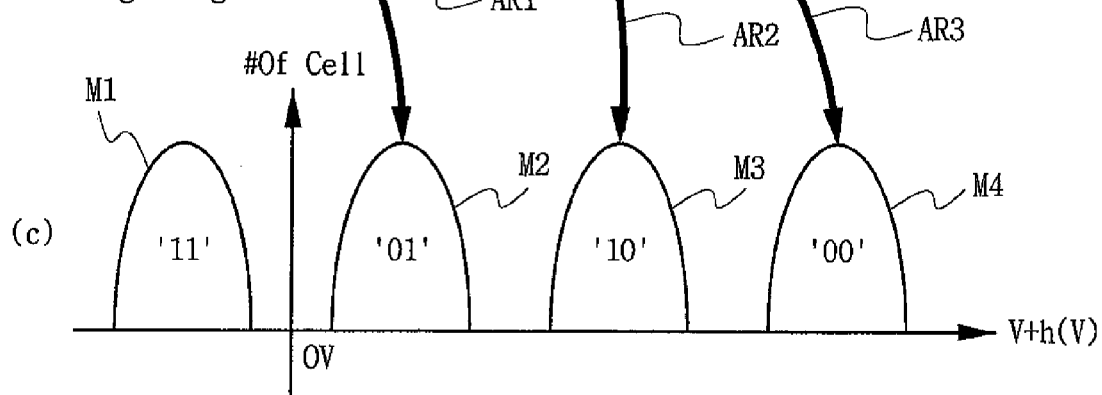

NONVOLATILE SEMICONDUCTOR MEMORY DEVICE WITH ADVANCED MULTI-PAGE PROGRAM OPERATION

CROSS-REFERENCE TO RELATED APPLICATION

This application is a continuation application of application Ser. No. 13/239,494 filed Sep. 22, 2011, now U.S. Pat. No. 8,234,440 B2 issued Jul. 31, 2012, which is a continuation application of application Ser. No. 12/021,395 filed on Jan. 29, 2008, now U.S. Pat. No. 8,046,525 B2 issued Oct. 25, 2011, which claims priority under 35 U.S.C. §119 of Korean Patent Application 10-2007-0012039 filed on Feb. 6, 2007, the entire contents of which are hereby incorporated by reference in its entirety.

BACKGROUND OF THE INVENTION

1. Field of the Invention

Embodiments of the invention relate to nonvolatile semiconductor memories. More particularly, embodiments of the invention relate to a multilevel nonvolatile semiconductor memory capable of storing data of two or more bits in one memory cell.

2. Description of the Related Art

A recently rapid development of information processing apparatuses such as a computer, etc. tends to bring about a high-speed operation and large capacity in semiconductor memory devices employed as main components of the information processing apparatuses.

Typically a semiconductor memory device may be largely classified as a volatile semiconductor memory device and a nonvolatile semiconductor memory device. The volatile semiconductor memory device may be subdivided into a dynamic random access memory and a static random access memory. The volatile semiconductor memory device is fast in read and write speed, but has a shortcoming that contents stored in memory cells are lost when an external power supply is cut off. Conversely, nonvolatile semiconductor memory devices may be classified as mask read only memory (MROM), programmable read only memory (PROM), erasable programmable read only memory (EPROM), electrically erasable programmable read-only memory (EEPROM), etc.

Such nonvolatile semiconductor memory devices have been typically used to store data even without external power. However, in the MROM, PROM, and EPROM, erase and write (or program) operations can not be executed through the electronic system itself. Thus making it difficult to erase or re-program programmed-contents in an on-board state. In an EEPROM, electrical erase and write operations are available through the system itself. This allows EEPROMs to be used as system program storage devices or auxiliary storage devices. Various types of electronic devices controlled by a computer or micro-processor require the development of high density electrically erasable and programmable EEPROMs. A data storage device used in, for example, a digital camera, must be compact, have a relatively higher density and higher performance characteristics.

A NAND-type flash EEPROM having a flash erase function appearing as the design and fabrication technique of EEPROM has been advanced which has a high integration as compared to a general EEPROM and is very advantageous to an application to a large-capacity auxiliary memory. The flash EEPROM is classified as NAND, NOR and AND types, depending upon what kinds of types in unit memory cell arrays are configured. It is well known that NAND type memory has high integration as compared to NOR or AND type.

A configuration of a general nonvolatile semiconductor memory device and fabrication sections of memory cells in a memory cell array are disclosed in, for example, U.S. Pat. No. 6,295,227 ("the '227 patent") published on Sep. 25, 2001. As disclosed in the '227 patent, a NAND type EEPROM may be comprised of a data input/output buffer, a row decoder for selecting word lines, a column decoder, a column gate, a page buffer for sensing and storing input/output data of memory cell transistors, a booster circuit for generating a boosted voltage, a control circuit for controlling operation of a memory device, and a memory cell array. The memory cell array includes word lines that intersect bit lines. Each memory cell transistor of a NAND cell unit (or cell string) stores data. The word lines control gates of the selected transistors and the memory cell transistors of the NAND cell unit.

A NAND cell unit is formed in a p-type well formed on an n type well. The NAND cell unit constituting a unit of one string is defined by a first selection transistor SST whose drain is connected to a bit line, a second selection transistor ST whose source is connected to a common source line, and 16 or 32 memory transistors whose channels are connected in series between a source of the first selection transistor SST and a drain of the second selection transistor ST. Each memory cell transistor constituting a NAND cell unit has a floating gate formed by interposing a gate oxide on a channel region between a source and a drain, and a control gate formed on the floating gate FG through an interlayer insulation layer. Charge functioning as program data through a program voltage applied to the control gate CG is gathered in floating gate FG.

The erase and program (or write) operations are performed by using F-N tunneling current. For example, in order to erase a memory cell, a very high potential is applied to a substrate and a low potential is applied to control gate CG. The potential determined by a coupling ratio of a capacitance between CG and FG and a capacitance between FG and the substrate is applied to the floating gate FG. When a potential difference between a floating gate voltage Vfg and a substrate voltage Vsub is greater than a potential difference creating the F-N tunneling, electrons gathered in the floating gate FG move to the substrate. This lowers a threshold voltage Vt of a memory cell transistor. Voltage Vt is sufficiently lowered and 0 V is applied to the control gate CG and the source. When an appropriate level of voltage is applied to the drain, current flows. This is commonly referred to as "ERASED" and is generally represented as logic '1'.

In order to write to a memory cell, 0V is applied to the source and drain and a very high voltage is applied to the control gate CG. An inversion layer is formed in channel region and the source and drain both have a potential of 0V. When a potential difference between Vchannel (0 V) and Vfg, which is determined on the basis of the coupling ratio of the capacitance between the control gate CG and the floating gate FG and the capacitance between the floating gate FG and the channel region (of the substrate), becomes enough to create F-N tunneling, electrons move from the channel region to the floating gate FG. In this manner, voltage Vt increases and when a predetermined level of voltage is applied to the CG, 0V is applied to the source, and an appropriate level of voltage is applied to the drain. This prevents current flow and is referred to as "PROGRAMMED" indicated as logic '0'

In the memory cell array, a page indicates memory cell transistors in which control gates are connected in common to a particular word line. Multiple pages include a plurality of memory cell transistors defining a cell block. A cell block unit generally includes one or a plurality of cell strings per bit line. The NAND flash memory has a page program mode to accommodate high speed programming. A page program operation is classified as a data loading operation and program operation. The data loading operation sequentially latches and stores, in data registers, data of a byte magnitude from input/output terminals. The data registers are referred to as a page buffer and correspond to the number of bit lines. The program operation includes simultaneously writing the data stored in the data registers to memory transistors associated with a selected word line through selected bit lines.

In the NAND-type EEPROM described above, read operation and program (write) operation are generally performed by a page unit. The erase operation is performed by a block unit. In particular, electron movement between a channel and a FG of the memory cell transistor appears only in the program and erase operations. In the read operation, data stored in a memory cell transistor is just read without damaging the data after the program and erase operations have been performed. In the read operation, a predetermined voltage (typically, a ground voltage) is applied to CG of a selected memory cell transistor and a voltage (typically, a read voltage) higher than the predetermined voltage is applied to CG of a non-selected memory cell transistor. Current flows or does not flow in a corresponding bit line according to a program state of the selected memory cell transistor. When a threshold voltage of the programmed memory cell is higher than a reference value under a predetermined voltage condition, the memory cell is an off-cell, thereby charging a corresponding bit line to a high voltage level. Conversely, when a threshold voltage of the programmed memory cell is lower than a reference value, the memory cell is an on-cell, and a corresponding bit line is discharged to a low level. A state of such a bit line is read out as '0' or '1' through a sense amplifier.

Increases in memory capacity have resulted in multilevel cell (MLC) technology in which data of 2 bits (i.e. four states) or more are programmed or stored in a single memory cell of, for example, a NAND type EEPROM. A threshold voltage of a floating gate MOS transistor defining one memory cell may have one of the four states by appropriately controlling the number of electrons injected into a floating gate in a multilevel program operating mode. In a multilevel read mode, a voltage which indicates a medium from among threshold voltages of four states, is applied as a primary read reference voltage. This is used to sense whether a selected memory cell belongs to a high state or a low state. Subsequently, two different secondary-read reference voltages are used to sense whether the memory cell has a most significant state among the high states or a least significant state among the low states.

Details for such multilevel NAND cell type flash memory are disclosed in U.S. Pat. No. 6,807,096 issued on Oct. 19, 2004 and U.S. Pat. No. 6,937,510 issued on Aug. 30, 2005 which is provided herein for reference only. A multilevel NAND flash memory has a page program mode for high-speed programs. FIG. 1 provides a multi-page programming method in a multilevel flash memory according to a conventional art. FIG. 2 illustrates timings related to the multi-page program illustrated in FIG. 1. FIG. 3 illustrates a distribution change of threshold voltage generally appearing in a multi-level data program.

Referring to FIG. 1 a method of 'multi-page program' is disclosed to simultaneously program four pages of data in order to increase programming speed in a multilevel NAND flash memory having four banks 1, 2, 3 and 4. Page data for the four banks are loaded into corresponding page buffers 60-63 in respective steps S1, S2, S3 and S4. The four banks are simultaneously selected and a program operation is performed into designated pages of respective banks through step S5. This page programming method is primarily used to shorten a program time per page in a multilevel flash memory based on a considerably low programming speed.

FIG. 2 illustrates timing diagrams provided when programming four pages through such multi-page program step sections S1, S2, S3, S4 and S5 related to the loading and programming associated with steps S1, S2, S3, S4 and S5 of FIG. 1. Step S1 includes in order, a time interval C1 receiving a data load command, time interval C2 receiving an address, time interval C3 receiving program data and time interval C4 receiving a program command. Program data is loaded into page buffers 60-63 corresponding to a respective bank in steps S1, S2, S3 and S4. In step S5, blocks 10-13 are selected at the same time to perform programming operations.

FIG. 3 illustrates a distribution change of threshold voltage generally appearing in a multilevel data program. A transverse axis indicates a threshold voltage of a memory cell, and a longitudinal axis indicates the number of programmed memory cells. In a flash memory that stores 2 bits of data in one memory cell, data of respective cells are allocated into mutually different pages. A graph (a) of FIG. 3 denotes a program operation of least significant bit (LSB) data. A voltage stepping of ISPP (Incremental Step Program Pulse) is determined largely in order to speed up the program. Then, a comparatively wide threshold voltage distribution is obtained. This type of programming method is called an "SLC Program". An LSB-programmed cell has a wider threshold voltage distribution in a step that adjacent cells are programmed, as shown in a graph (b) of FIG. 3, as compared with the graph (a). Graph (c) of FIG. 3 denotes programming operation of most significant bit (MSB) data. Of the cells left in the erase state after the programming of LSB data '1', a cell into which an MSB data '0' is loaded moves to a state of '01' as shown in an arrow AR1. Of the cells into which LSB data '0' is programmed, a cell into which MSB data '1' is loaded moves to a state of '10' as shown in an arrow AR2. Of the cells into which LSB data '0' is programmed, a cell into which MSB data '0' is loaded moves to a state of '00' as shown in an arrow AR3. Accordingly, in the programming step of adjacent cells after the LSB program, the threshold voltage distribution effect becomes wide to compensate for a disturbance and a threshold voltage distribution can be controlled more precisely. In such a programming method, the LSB page program can be obtained earlier by making the ISPP program voltage step greater, but the MSB page program has a considerably lower programming speed as compared with the LSB page program because it needs to precisely control three threshold voltage states. For example, when an LSB page program time tLSB is 200 µs, and an MSB page program time tMSB is 1400 µs where an average page program time becomes tPGM=(tLSB+tMSB)/2=800 µs. As a result, in the multi-page programming method as illustrated in FIG. 1, four pages are programmed at a time such that the average program time is 800 µs/4=200 µs. In the programming method of FIG. 1, a program unit becomes four pages. Consequently, a controller can provide efficient program performance when data for four pages are loaded and programmed at a time. When the program unit becomes large, an overall program time can be shortened with this enhanced program performance. However, the large program unit may have an inefficient aspect in view of managing a file system. It is, therefore, required to find a method to increase a program speed while maintaining a smaller program unit. Accordingly, there is a need for a method to enhance program speed while keeping a relatively smaller program unit in a multilevel flash memory.

SUMMARY OF THE INVENTION

Exemplary embodiments of the present invention are directed to a nonvolatile semiconductor memory device capable of reducing programming time without increasing a unit of program of a multilevel flash memory. In an exemplary embodiment, a nonvolatile semiconductor memory device for performing a programming of multilevel data includes a memory cell array having a plurality of banks, each including a cache block, and a plurality of page buffer. The page buffer corresponds to each of the plurality of banks and is configured to load page data. The cache block corresponds to each of the plurality of banks having a predetermined data storage capacity. The cache block programming the banks, except a last of the plurality of banks, with the page data from the page buffer such that when page data for the last of the plurality of banks is loaded into the page buffer, the loaded page data and the page data programmed into the respective cache blocks are programmed into corresponding banks.

BRIEF DESCRIPTION OF THE DRAWINGS

FIG. 3 illustrates a distribution change of threshold voltage generally appearing in a multilevel data program;

DESCRIPTION OF EMBODIMENTS

Figure 1:
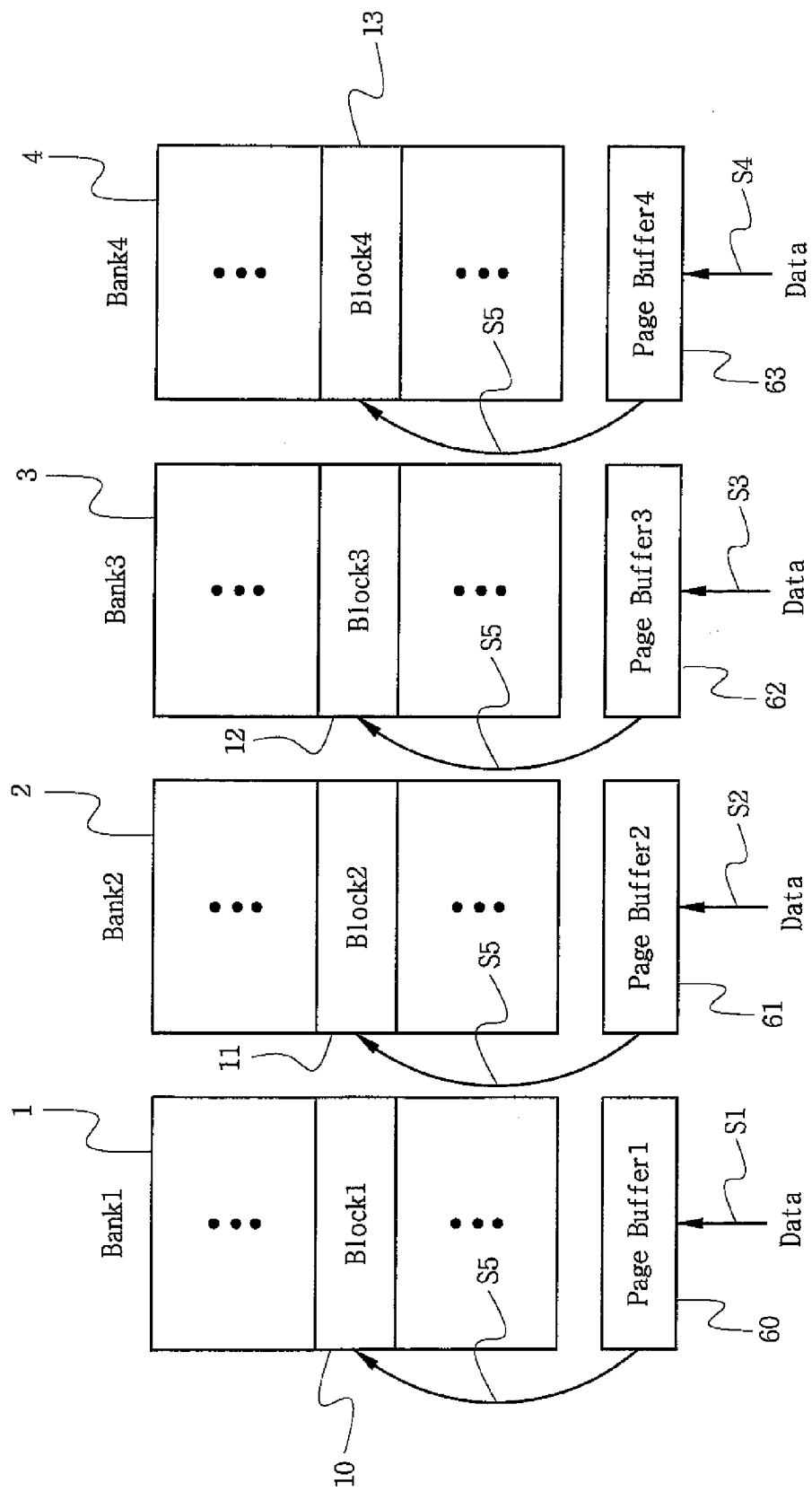
FIG. 1 provides a multi-page programming method in a multilevel flash memory according to a conventional art.
Figure 2:
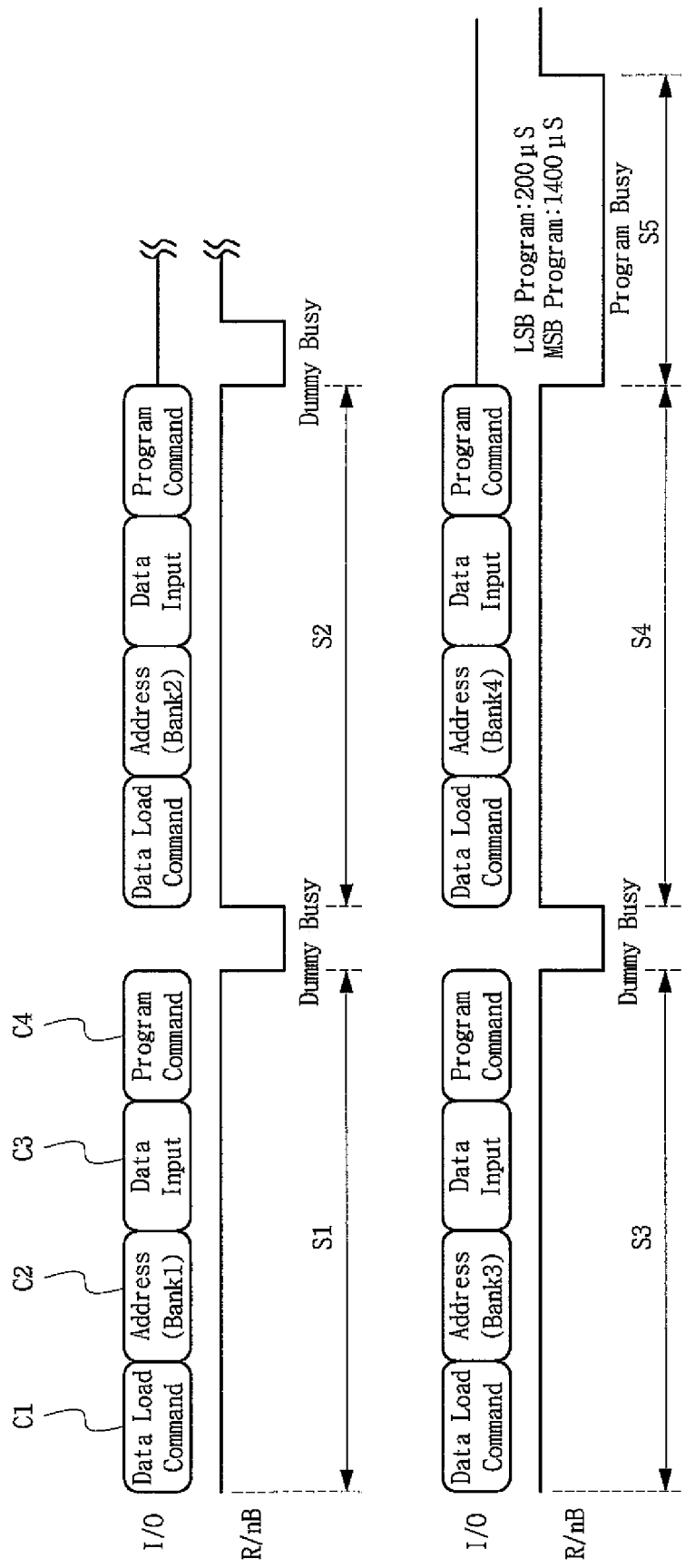
FIG. 2 illustrates timings related to a multi-page program of FIG. 1.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

According to an embodiment of the invention a cache block having a predetermined data storage capacity is adapted in each bank of a memory cell array to reduce programming time without increasing a unit of program as compared to a conventional program scheme. A programming circuit sequentially performs an operation of loading page data into a corresponding page buffer and an operation of programming the loaded page data into a corresponding cache block in association with rest banks (except a last bank among the banks). When page data for the last bank are loaded in the page buffer, the loaded page data and the page data programmed in the respective cache blocks are programmed at a time in each corresponding bank.

The programming circuit may comprise function blocks necessary for a data loading and execution of program, for example, a data input/output buffer, row decoder, column decoder, column gate, high voltage generating circuit and control circuit, in a nonvolatile semiconductor memory device.

Figure 4:
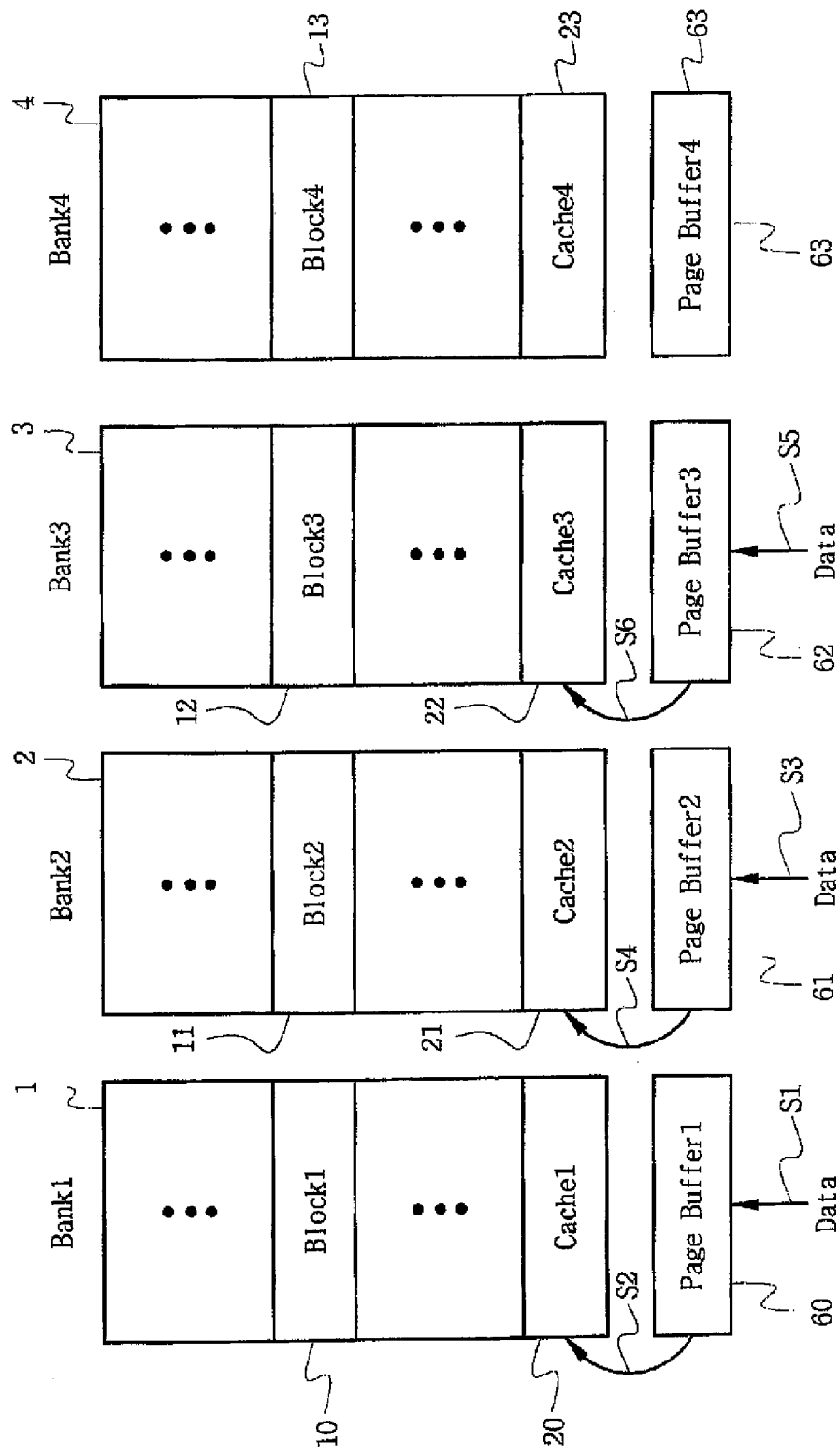
FIGS. 4 to 6 illustrate a multi-page program sequence through respective steps in a multilevel flash memory according to some embodiments of the invention.
Figure 5:
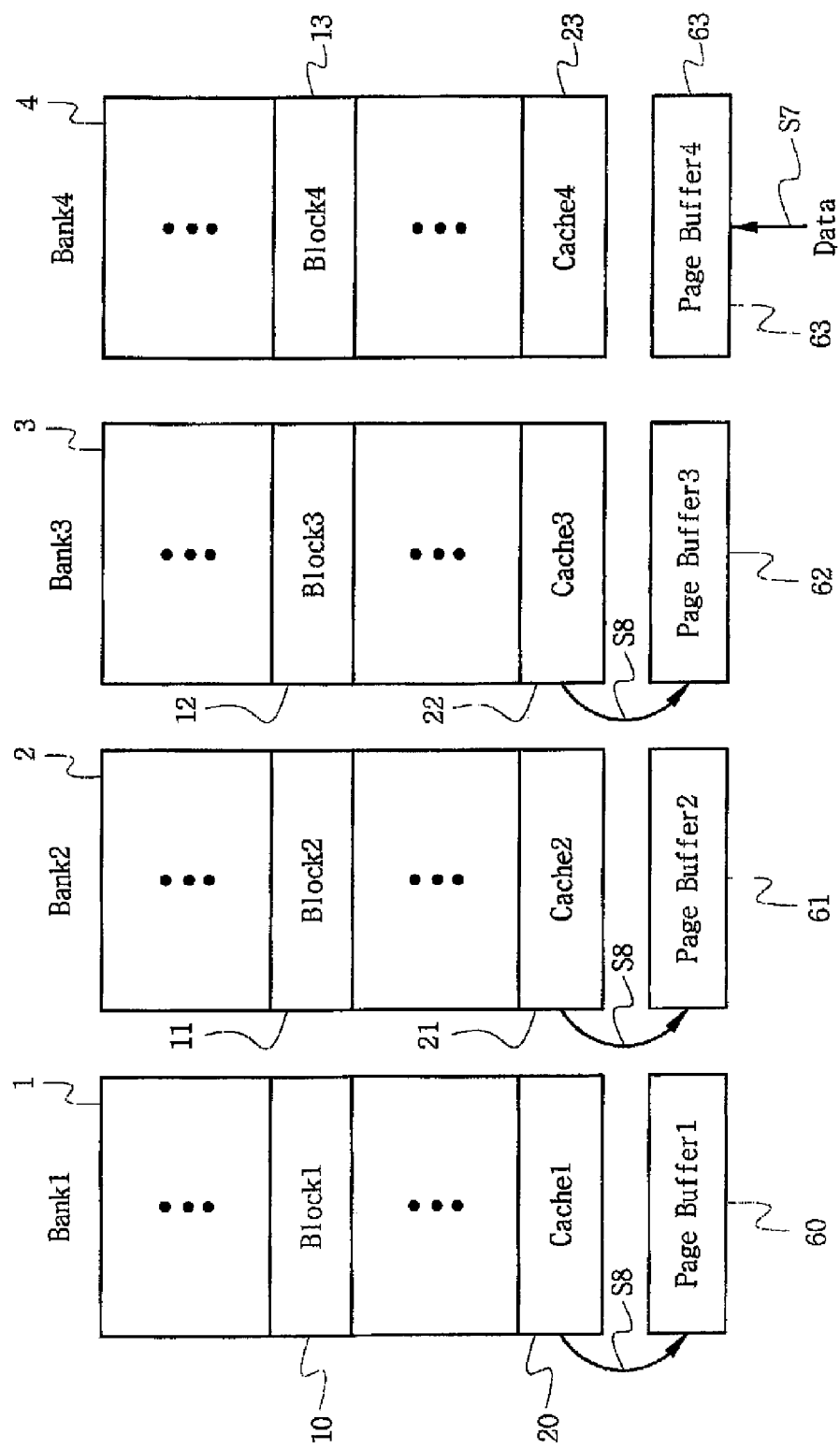
Figure 6:
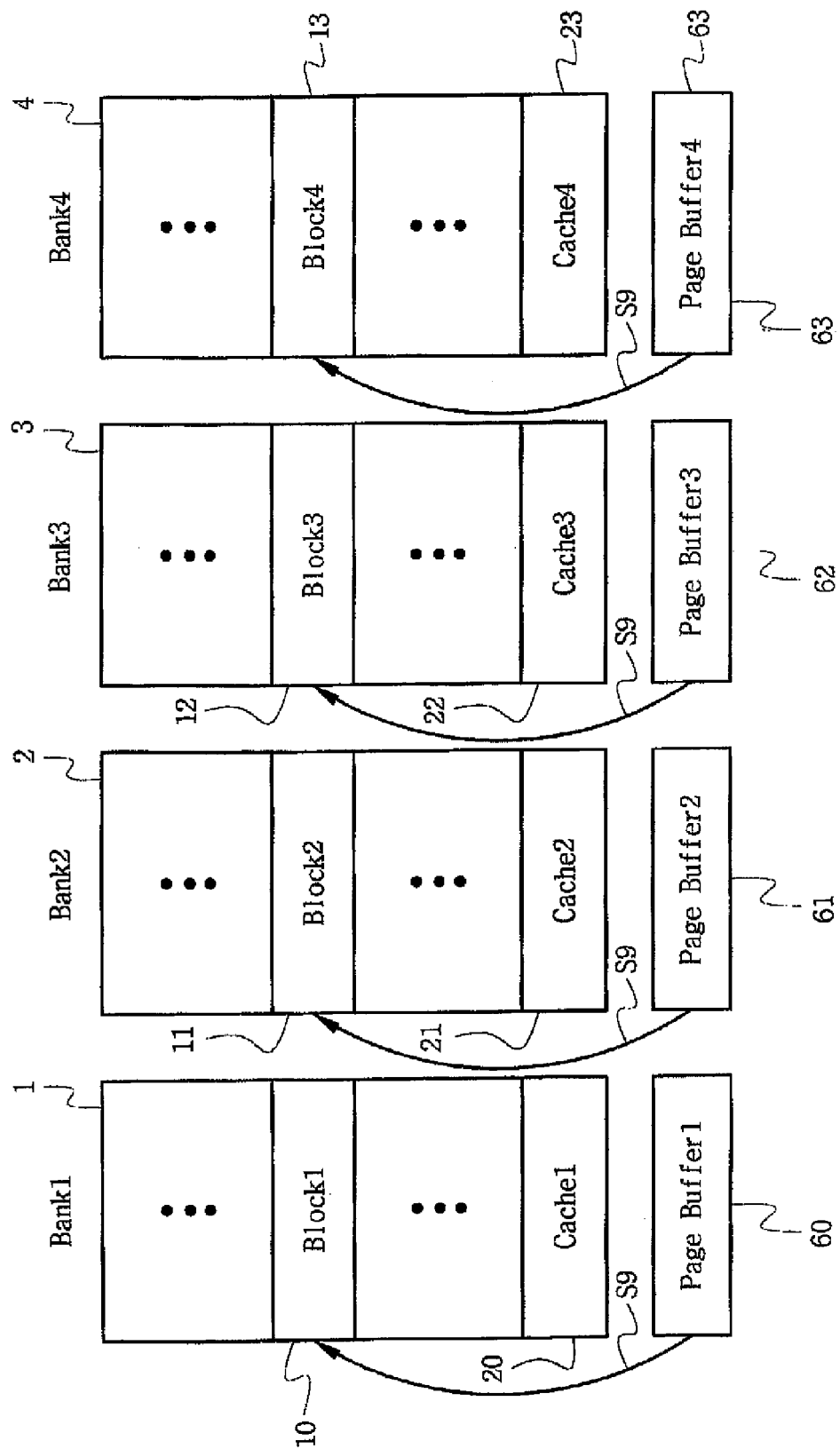
Figure 7:
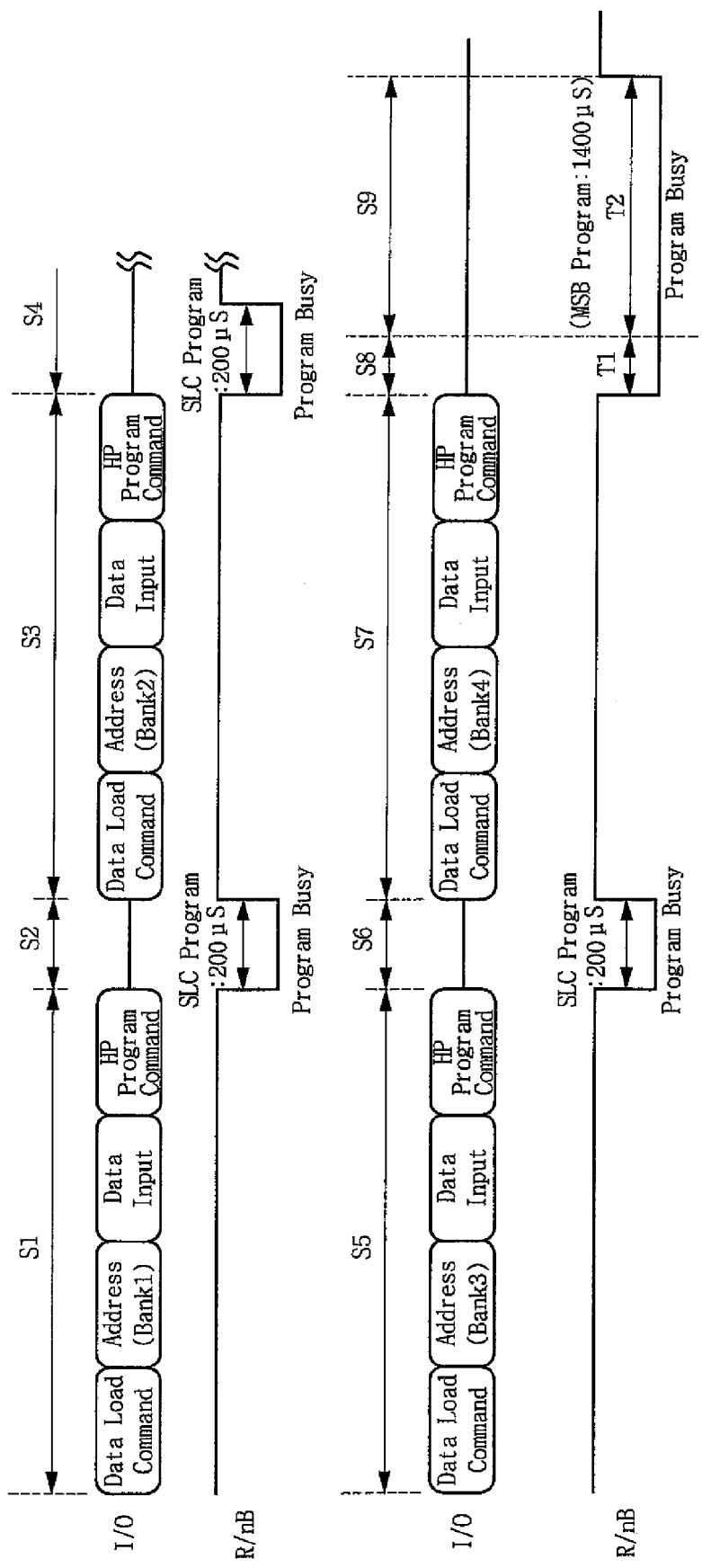
FIG. 7 illustrates timings of the multi-page program referred to in FIGS. 4 to 6.

FIGS. 4 to 6 illustrate a most significant bit (MSB) page program sequence through respective steps in a multilevel flash memory. Reference numbers S1, S2, S3, S4, S5, S6, S7, S8 and S9 related to a loading, cache program and MSB program shown in FIG. 7 each correspond to steps S1, S2, S3, S4, S5, S6, S7, S8 and S9 shown in FIGS. 4 to 6. Turning briefly to FIG. 7, step S1 has in order, a time interval receiving a data load command, time interval receiving an address, time interval receiving program data, and time interval receiving a program command. Step S2 includes a time interval of performing an SLC program into a cache block. In steps S2, S4 and S6, operation of programming each cache block with MSB data is performed. In step S8, operation of copying the MSB data programmed in each cache block back to a corresponding page buffer is implemented. In step S9, operation of programming blocks 10-13 of four banks with MSB page data through page buffer is performed. "HP Program Command" shown in FIG. 7 indicates "High Performance Program Command" as a specific program command to perform a high speed program through cache block.

Referring to FIG. 4, an operation of programming a plurality of banks with multilevel data will be described. It is assumed that the number of banks is four. Each of first to fourth banks 1 to 4 includes a plurality of memory blocks, each including a plurality of memory cells, and a cache block. Page buffers 60-63 are provided corresponding to the first to fourth banks 1 to 4. Steps S1-S6 provide procedures of sequentially implementing a high-speed cache program in three banks 1, 2 and 3. Each of the respective blocks 10, 11, and 12 is selected from each bank. The data are loaded in each page buffer 60, 61, 62 and programmed into a corresponding cache block 20-22. The MSB page data programmed into each cache block 20-22 is programmed through an algorithm such as an LSB page program. For example, an SLC program algorithm has a program time of 200 µS per page as shown in step sections S2, S4 and S6 of FIG. 7.

Cache blocks 20-23 each have a capacity to store individually loaded page data and are constructed of memory cells such as multilevel memory cells provided within an associated bank 1-4. Data programmed through cache blocks 20-22 are MSB page data. When a specific cache program command, for example "HP Program Command" is input, a high speed program for selected cache blocks is implemented. The least significant bit (LSB) page data is programmed directly into corresponding memory blocks of a selected bank without passing through cache blocks 20-22. As a result, an LSB page program is performed similar to that disclosed in the conventional art, and an MSB page program is performed as illustrated in FIGS. 4 to 6. By programming the MSB in this manner, program speed is improved without increasing a unit of program.

FIG. 5 illustrates steps of loading MSB data into a fourth page buffer 63 and then copying data programmed into the cache blocks 20-22 back to corresponding page buffers 60-62 via steps S7 and S8. After the MSB data is loaded in fourth page buffer 63 through step S7, a high speed program command is input. The MSB page data individually programmed in cache blocks 20, 21 and 22 of banks 1, 2 and 3 are programmed at a time corresponding to page buffers 60, 61 and 62 for a time interval T1 of FIG. 7. This is referred to as a copy-back operation which is performed through step S8.

FIG. 6 illustrates steps that MSB page data contained in page buffers 60-63 are simultaneously programmed into memory blocks 10-13 respectively through simultaneous operating step S9. This programming algorithm time is about 1400 µS and is needed as shown in time interval T2 of FIG. 7. Thus, the total programming time for four pages with MSB page data is '3×200 µS (for blocks 1-3)+1400 µS (for block 4)=2000 µS. The average program time of one page taken in the MSB page program is 'tMSB=2000 μS/4=500 μS. The time taken in LSB page program is 'tLSB=200 μS as in the conventional art. Therefore, an average program time taken when one page is programmed becomes 'tPGM=(tLSB+tMSB)/2=350 μS. Accordingly, the average programming time can be reduced in performing a data loading of each page using a cache block adapted inside a semiconductor chip. This programming time reduction is done without increasing a unit of program in a multilevel flash memory as compared with a conventional program scheme, thereby enhancing memory device performance.

Although the present invention has been described in connection with the embodiment of the present invention illustrated in the accompanying drawings, it is not limited thereto. It will be apparent to those skilled in the art that various substitutions, modifications and changes may be made thereto without departing from the scope and spirit of the invention.

What is claimed is:

1. A method of performing a programming of $1^{st}$ through $N^{th}$ page data in a nonvolatile memory, where N is an integer greater than 2, and where the nonvolatile memory comprises a memory cell array and page buffers, the memory cell area comprising a single level cell (SLC) area and a multi level cell (MLC) area, and the page buffers commonly used for both of the SLC area and the MLC area, the method comprising the operations of:
   (a) loading the $1^{st}$ page data to the page buffers;
   (b) programming the $1^{st}$ page data from the page buffers to the SLC area using an SLC programming operation after operation (a);
   (c) repeating operations (a) through (b) for $2^{nd}$ page data;
   (d) loading $3^{rd}$ page data to the page buffers after operation (c);
   (e) reading the $1^{st}$ page data and the $2^{nd}$ page data from the SLC area to the page buffers after operation (d); and then,
   (f) programming the $1^{st}$ page data, the $2^{nd}$ page data and the $3^{rd}$ page data from the page buffers to the MLC area using an MLC programming operation simultaneously.

2. The method of claim 1, wherein the $1^{st}$ page data is programmed from the page buffers to a first wordline of the SLC area in operation (b), and the 2nd page data is programmed from the page buffers to a second wordline of the SLC area in operation (c).

3. The method of claim 1, wherein reading the $1^{st}$ page data and the $2^{nd}$ page data from the SLC area to the page buffers in operation (e) is performed sequentially.

4. The method of claim 1, wherein the $1^{st}$ page data is least significant bit (LSB) page data, and the $3^{rd}$ page data is most significant bit (MSB) page data.

5. The method of claim 1, wherein the $1^{st}$ page data, the $2^{nd}$ page data and the $3^{rd}$ page data have different addresses from each other.

6. The method of claim 1, wherein a time of the SLC programming operation is shorter than a time of the MLC programming operation.

7. A nonvolatile semiconductor memory device, comprising:
   a memory cell array comprising a single level cell (SLC) area and a multi-level cell (MLC) area; and
   page buffers, each being configured to load a page data, wherein each of $1^{st}$ page data and $2^{nd}$ page data is loaded to the page buffers and then is programmed to the SLC area using an SLC programming operation, sequentially, $3^{rd}$ page data is loaded to the page buffers,
   the $1^{st}$ page data and the $2^{nd}$ page data are read from the SLC area to the page buffers after the load of the $3^{rd}$ page data, and then,
   the $1^{st}$ page data, the $2^{nd}$ page data and the $3^{rd}$ page data are programmed from the page buffers to the MLC area using an MLC programming operation.

8. The device of claim 7, wherein the $1^{st}$ page data is programmed from the page buffers to a first wordline of the SLC area, and the 2nd page data is programmed from the page buffers to a second wordline of the SLC area.

9. The device of claim 7, wherein the $1^{st}$ page data and the $2^{nd}$ page data are read from the SLC area to the corresponding page buffer sequentially.

10. The device of claim 7, wherein the $1^{st}$ page data, the $2^{nd}$ page data and the $3^{rd}$ page data are programmed from the corresponding page buffer to the MLC area simultaneously.

11. The device of claim 7, wherein the $1^{st}$ page data is least significant bit (LSB) page data, and the $3^{rd}$ page data is most significant bit (MSB) page data.

12. A method of performing a programming of $1^{st}$ through $4^{th}$ page data in a nonvolatile memory which comprises a memory cell array and page buffers, the memory cell array comprising a single level cell (SLC) area and a multi level cell (MLC) area, and the page buffers commonly used for both of the SLC area and the MLC area, the method comprising the operations of:
   (a) loading the $1^{st}$ page data to the page buffers;
   (b) programming the $1^{st}$ page data from the page buffers to the SLC area using an SLC programming operation after operation (a);
   (c) repeating operations (a) through (b) for $2^{nd}$ page data;
   (d) repeating operations (a) through (b) for $3^{rd}$ page data;
   (e) loading the 4-th page data to the page buffers after operation (d);
   (f) reading the $1^{st}$ page data, the $2^{nd}$ page data and the $3^{rd}$ page data from the SLC area to the page buffers after operation (e); and then,
   (g) programming the $1^{st}$ page data, the $2^{nd}$ page data, the $3^{rd}$ page data and the 4-th page data from the page buffers to the MLC area using an MLC programming operation simultaneously.

13. The method of claim 12, wherein the $1^{st}$ page data is programmed from the page buffers to a first wordline of the SLC area in operation (b), the 2nd page data is programmed from the page buffers to a second wordline of the SLC area in operation (c), and the $3^{rd}$ page data is programmed from the page buffers to a third wordline of the SLC area in operation (d).

14. The method of claim 12, wherein reading the $1^{st}$ page data, the $2^{nd}$ page data, and the $3^{rd}$ page data from the SLC area to the page buffers in operation (f) is performed sequentially.

15. The method of claim 12, wherein the $1^{st}$ page data is least significant bit (LSB) page data and the 4-th page data is most significant bit (MSB) page data.

16. The method of claim 12, wherein the $1^{st}$ page data, the $2^{nd}$ page data, the $3^{rd}$ page data, and the $4^{th}$ page data have different addresses from each other.

17. The method of claim 12, wherein a time of the SLC programming operation is shorter than a time of the MLC programming operation.

* * * * *